(12) United States Patent
Szubbocsev et al.

(10) Patent No.: US 11,704,254 B2
(45) Date of Patent: *Jul. 18, 2023

(54) HOST SIDE CACHING SECURITY FOR FLASH MEMORY

(71) Applicant: Micron Technology, Inc., Boise, ID (US)

(72) Inventors: Zoltan Szubbocsev, Santa Clara, CA (US); Alberto Troia, Munich (DE); Federico Tiziani, Munich (DE)

(73) Assignee: Micron Technology, Inc., Boise, ID (US)

( * ) Notice: Subject to any disclaimer, the term of this patent is extended or adjusted under 35 U.S.C. 154(b) by 67 days.

This patent is subject to a terminal disclaimer.

(21) Appl. No.: 17/319,834

(22) Filed: May 13, 2021

(65) Prior Publication Data

US 2021/0279182 A1 Sep. 9, 2021

Related U.S. Application Data

(63) Continuation of application No. 16/023,247, filed on Jun. 29, 2018, now Pat. No. 11,036,651.

(51) Int. Cl.
*G06F 21/00* (2013.01)
*G06F 12/14* (2006.01)
*G06F 21/60* (2013.01)

(52) U.S. Cl.
CPC ........ *G06F 12/1408* (2013.01); *G06F 21/602* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 6,272,637 B1 | 8/2001 | Little et al. | |
| 7,873,837 B1* | 1/2011 | Lee | G06F 21/32 713/189 |
| 8,060,756 B2 | 11/2011 | Rao et al. | |
| 8,756,375 B2* | 6/2014 | Flynn | G06F 12/0868 711/202 |
| 10,133,681 B2* | 11/2018 | Canepa | H04L 9/3228 |
| 10,296,249 B2* | 5/2019 | Benisty | G06F 1/3287 |
| 10,566,082 B1 | 2/2020 | Mcnair | |

(Continued)

FOREIGN PATENT DOCUMENTS

| | | |
|---|---|---|
| CN | 112313634 A | 2/2021 |
| WO | WO-2020006464 A1 | 1/2020 |

OTHER PUBLICATIONS

"European Application Serial No. 19827238.7, Extended European Search Report dated Feb. 14, 2022", 8 pgs.

(Continued)

*Primary Examiner* — Maung T Lwin
(74) *Attorney, Agent, or Firm* — Schwegman Lundberg & Woessner, P.A.

(57) ABSTRACT

Various examples are directed to systems and methods for managing a memory system. The memory system may generate a first encrypted physical address using a first clear physical address. The memory system may generate a first encrypted logical-to-physical (L2P) pointer indicating the first logical address and a first encrypted physical address. The memory system may send the first encrypted L2P pointer to a host device for storage at a host memory.

20 Claims, 10 Drawing Sheets

(56) References Cited

U.S. PATENT DOCUMENTS

| | | |
|---|---|---|
| 11,036,651 B2 | 6/2021 | Szubbocsev et al. |
| 2008/0082736 A1 | 4/2008 | Chow et al. |
| 2008/0288785 A1* | 11/2008 | Rao .................. G06F 21/72 |
| | | 711/E12.092 |
| 2010/0268864 A1 | 10/2010 | Ramiya |
| 2011/0113213 A1 | 5/2011 | Obr et al. |
| 2012/0047373 A1 | 2/2012 | Rao et al. |
| 2012/0198137 A1 | 8/2012 | Mothilal |
| 2012/0246442 A1 | 9/2012 | Dolgunov et al. |
| 2012/0260101 A1 | 10/2012 | Hunt |
| 2013/0054934 A1* | 2/2013 | Mitsugi ............... G06F 12/109 |
| | | 711/E12.016 |
| 2013/0145177 A1 | 6/2013 | Cordella et al. |
| 2013/0185555 A1 | 7/2013 | Wang et al. |
| 2014/0006797 A1 | 1/2014 | Cordella et al. |
| 2014/0195725 A1 | 7/2014 | Bennett |
| 2014/0325115 A1* | 10/2014 | Ramsundar ........... G06F 3/0688 |
| | | 711/163 |
| 2015/0019878 A1 | 1/2015 | Gammel |
| 2015/0169472 A1 | 6/2015 | Yap et al. |
| 2016/0055101 A1 | 2/2016 | Gerhart et al. |
| 2016/0140356 A1* | 5/2016 | Tasher ................. G06F 3/0623 |
| | | 726/29 |
| 2016/0170909 A1* | 6/2016 | Gerhart ................. G09C 1/00 |
| | | 713/193 |
| 2016/0197722 A1 | 7/2016 | Mothilal |
| 2017/0192902 A1 | 7/2017 | Hwang et al. |
| 2017/0206030 A1 | 7/2017 | Woo et al. |
| 2018/0052768 A1 | 2/2018 | Bae et al. |
| 2018/0150256 A1 | 5/2018 | Kumar et al. |
| 2020/0004694 A1 | 1/2020 | Szubbocsev et al. |

OTHER PUBLICATIONS

"Japanese Application Serial No. 2020-572971, Notification of Reasons for Refusal dated Mar. 8, 2022", w English translation, 10 pgs.

"European Application Serial No. 19827238.7, Response filed Aug. 9, 2021 to Communication pursuant to Rules 161(2) and 162 EPC dated Feb. 5, 2021", 15 pgs.

"International Application Serial No. PCT/US2019/039902, International Preliminary Report on Patentability dated Jan. 7, 2021", 7 pgs.

"Japanese Application Serial No. 2020-572971, Final Notification of Reasons for Refusal dated Sep. 27, 2022", w/ English translation, 4 pgs.

"Japanese Application Serial No. 2020-572971, Response filed Oct. 13, 2022 to Final Notification of Reasons for Refusal dated Sep. 27, 2022", w/ English Claims, 17 pgs.

"Korean Application Serial No. 10-2021-7002813, Notice of Preliminary Rejection dated Oct. 31, 2022", w/ English translation, 11 pgs.

* cited by examiner

HOST SIDE CACHING SECURITY FOR FLASH MEMORY

PRIORITY APPLICATION

This application is a continuation of U.S. application Ser. No. 16/023,247, filed Jun. 29, 2018, which is incorporated herein by reference in its entirety.

BACKGROUND

Memory systems are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory systems typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multilevel cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Some memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory systems, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) may extend adjacent a string of storage cells to form a channel for the storages cells of the string. In the example of a vertical string, the polysilicon structure may be in the form of a vertically extending pillar. In some examples the string may be "folded," and thus arranged relative to a U-shaped pillar. In other examples, multiple vertical structures may be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory systems, including a number of dies or logical units (e.g., logical unit numbers or LUNs), and can include one or more processors or other controllers performing logic functions required to operate the memory systems or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory systems and the host, or erase operations to erase data from the memory systems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
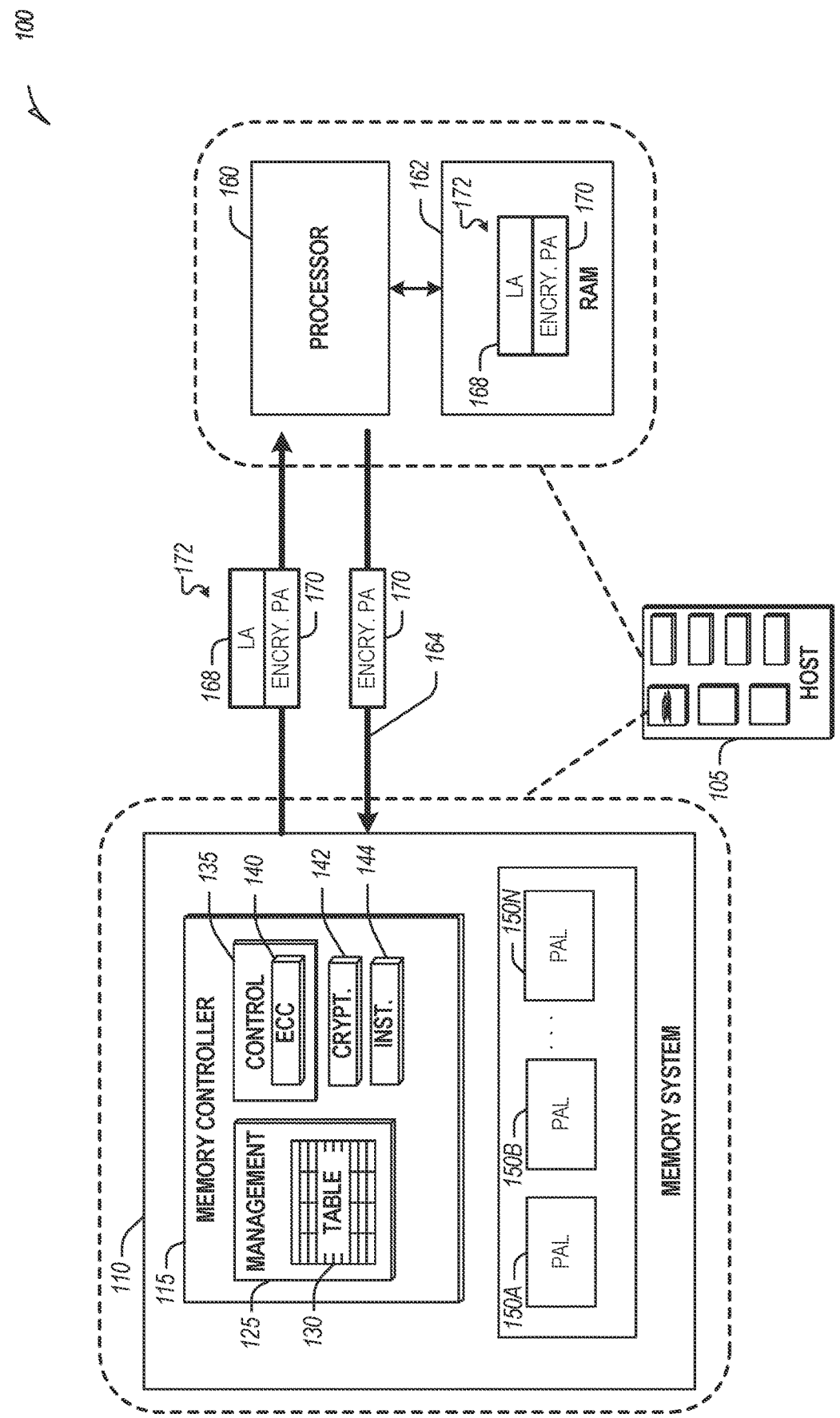
FIG. 1 illustrates an example of an environment including a host device and a memory system configured to communicate over a communication interface.

Aspects of the present disclosure are directed to a memory system with secure host device caching. A memory system can be configured to maintain a set of logical-to-physical (L2P) pointers. An L2P pointer relates a physical address at a memory array of the memory system to a logical address used, for example at the host device. L2P pointers can be stored in a common data structure as an L2P table. Read and write requests made by the host device can include a logical address associated with a data unit to be read or written. The memory system uses to logical address to generate and/or access a previously-generated L2P pointer that relates to the logical address to one or more physical addresses at the memory array.

To maintain persistence, L2P pointers can be stored at the memory array of a memory system. During use of the memory system, the L2P pointers can be read directly from the memory array. If the memory system controller includes RAM, then some or all of the L2P pointers can be stored at the RAM during use to decrease latency. For example, read operations at the memory system controller RAM may be faster than read operations at the memory array. For some applications, however, the device controller RAM is too small to load a full L2P table for the memory array. Further, some memory system controllers do not include RAM.

Accordingly, in some examples, a memory system is configured to cache some or all of its L2P table including L2P pointers at the host device. The L2P pointers may be stored at a RAM of the host device. When making a read request at a logical address, the host device determines if it has cached a copy of the L2P pointer corresponding to that logical address. If the host device has a cached copy of the L2P pointer, it uses the L2P pointer to resolve the physical address at the memory system that corresponds to the logical address. The host device can make a read request to the memory system using the physical address. The memory system returns the data stored at the physical address.

Caching L2P pointers at the host device can provide certain advantages. For example, it may allow data to be retrieved faster because the memory system may not execute a separate read operation at the memory array to access the L2P pointer. Also, it may reduce the need for RAM at the memory system because the memory system may not need to separately cache L2P pointers that are cached at the host device.

On the other hand, caching L2P pointers at the host device can expose the physical address structure of the memory system to the host device. This can lead to vulnerabilities. For example, the host device may be able to modify physical addresses from cached L2P pointers in a predictable way to access data at the memory system beyond what was intended. Also, if the host device may be able to modify cached L2P pointers to bring about unintended changes at the memory system.

Aspects of the present disclosure address the above and other deficiencies by encrypting physical addresses included with L2P pointers that are cached at the host device. The memory system (e.g., the controller thereof) can generate an encrypted physical address using a physical address and a cryptographic key. The memory system generates an encrypted L2P pointer that indicates the encrypted physical address and a corresponding logical address. The logical address may be unencrypted, also referred to here as "clear" or "in the clear." The encrypted L2P pointer is cached at the host device.

The host device uses the clear logical address to access an appropriate encrypted L2P pointer that has been cached at the host device. The host device makes a read or write request (read/write request) to the memory system using the encrypted physical address. Upon receiving the read/write request, the memory system decrypts the encrypted physical address to generate a clear physical address. The memory system then performs the requested operation using the clear physical address.

Because the host device is not given access to the clear physical address, it may be more difficult for the host device to derive other physical addresses at the memory system and access unintended data or make unintended modifications to the memory system.

FIG. 1 illustrates an example of an environment 100 including a host device 105 and a memory system 110 configured to communicate over a communication interface. The host device 105 or the memory system 110 may be included in a variety of products, such as Internet of Things (IoT) devices (e.g., a refrigerator or other appliance, sensor, motor or actuator, mobile communication device, automobile, drone, etc.) to support processing, communications, or control of the product.

The memory system 110 includes a memory controller 115 and a memory array 120 including, for example, a number of individual memory die (e.g., a stack of two-dimensional or three-dimensional (3D) NAND die). In 3D architecture semiconductor memory technology, vertical structures are stacked, increasing the number of tiers, physical pages, and accordingly, the density of a memory system (e.g., a storage device). In an example, the memory system 110 can be a discrete memory or storage device component of the host device 105. In other examples, the memory system 110 can be a portion of an integrated circuit (e.g., system on a chip (SOC), etc.), stacked or otherwise included with one or more other components of the host device 105.

In the example environment 100 of FIG. 1, the host device 105 includes a processor 160 and host RAM 162. Host RAM 162 may include DRAM, SDRAM, or any other suitable volatile or non-volatile memory component. One or more communication interfaces can be used to transfer data between the memory system 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include an electronic device, a processor, a memory card reader, or one or more other electronic devices external to the memory system 110. In some examples, the host device 105 may be a machine having some portion, or all, of the components discussed with reference to the machine 1000 of FIG. 10. Also, additional examples of host devices 105 are discussed with reference to FIG. 9.

The memory controller 115 can receive instructions from the host device 105, and can communicate with the memory array 120, such as to transfer data to (e.g., write or erase) or from (e.g., read) one or more of the memory cells, planes, sub-blocks, blocks, or pages of the memory array 120. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host device 105 and the memory system 110. The memory controller 115 can include one or more input/output (I/O) circuits, lines, or interfaces to transfer data to or from the memory array 120. The memory controller 115 can include a memory manager 125 and an array controller 135.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory system 110.

The memory manager 125 can include a set of management tables 130 configured to maintain various information associated with one or more component of the memory system 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things.

Management tables 130 can also include one or more L2P table including L2P pointers relating logical addresses to physical addresses at the memory array 120, as described herein. In some examples, the management tables 130 can include a clear L2P table and an encrypted L2P table. The clear L2P table includes L2P pointers indicating clear logical addresses and clear physical addresses. The encrypted L2P table includes encrypted L2P pointers that indicate encrypted physical addresses and clear logical addresses. The management tables 130 are show at the manager 125. For example, the management tables 130 may be stored at a RAM of the memory controller 115. In some examples, some or all of the management tables 130 are stored at the memory array. For example, the manager 125 may read the management tables 130 from the memory array 120 and/or cache some or all of the management tables 130.

The array controller 135 can include, among other things, circuitry or components configured to control memory operations associated with writing data to, reading data from, or erasing one or more memory cells of the memory system 110 coupled to the memory controller 115. The memory operations can be based on, for example, host commands received from the host device 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory system 110 coupled to the memory controller 115. The memory controller 115 can be configured to actively detect and recover from error occurrences (e.g., bit errors, operation errors, etc.) associated with various operations or storage of data, while maintaining integrity of the data transferred between the host device 105 and the memory system 110, or maintaining integrity of stored data (e.g., using redundant RAID storage, etc.), and can remove (e.g., retire)

failing memory resources (e.g., memory cells, memory arrays, pages, blocks, etc.) to prevent future errors.

In the example environment 100 of FIG. 1, the memory controller 115 also includes a cryptographic engine 142. The cryptographic engine 142 can be configured to execute cryptographic operations on data, for example, as described herein. The cryptographic engine 142 may include one or more key registers and one or more math engines. Key registers can store cryptographic keys used to execute cryptographic operations. Although key registers are described as components of the cryptographic engine 142, in some examples, key registers may be positioned elsewhere, for example, a secured location at the memory array 121. The math engine can be configured to perform cryptographic operations, for example, utilizing one or more cryptographic keys stored at a key register.

The cryptographic engine 142 can be configured to execute one or more cryptographic operations to generate digital signatures as described herein. The cryptographic engine 142 can be configured to generate digital signatures using any suitable cryptographic algorithm such as, for example, a cryptographic hash function such as an SHA algorithm (e.g., SHA256), the MD5 algorithm, etc. A cryptographic has function maps an input value to a, usually shorted, hash value. The hash function can be selected such that it is unlikely that two different input values will map to the same hash value. The cryptographic engine 142 can be configured to generate a digital signature by executing a hash function on an input value related to the thing being digitally signed. For example, the cryptographic engine 142 can concatenate a signed command to be executed, a memory system counter value, and a cryptographic key to form an input value. The cryptographic engine 142 can then execute the has function on the input value to generate a digital signature.

In some examples, the cryptographic engine 142 is configured to operate in conjunction with a communication interface between the host device 105 and the memory system 110A. For example, the cryptographic engine 142 may comprise a key register or other suitable storage location for storying a cryptographic key that is used for encrypting and/or generating digital signatures related to communications between the memory system 110A and host device 105, for example, according to the PCIe or other suitable interface. Also, in some examples, the cryptographic engine 142 comprises a key register that stores a server root key. The server root key for a memory system is the cryptographic key used to verify signed commands, as described herein.

The cryptographic engine 142 can be configured to implement symmetric encryption, asymmetric encryption and/or both using any suitable cryptographic operations. For example, the cryptographic engine 142 may utilize one or more asymmetric operations such as Advanced Encryption Standard (AES) operations, Data Encryption Standard (DES) operations, Triple DES operations, etc. In some examples, the cryptographic engine 142 may utilize one or more symmetric operations such as Rivest-Shamir-Adleman (RSA) encryption. The cryptographic engine 142 can be implemented in hardware, software, or a combination of both hardware and software. For example, the cryptographic engine 142 can include instructions executed at a processor or similar hardware component of the memory controller 115. Also, in some examples, the cryptographic engine 142 can include dedicated hardware for executing cryptographic operations.

The memory array 120 can include several memory cells arranged in, for example, in one or more devices, one or more planes, one or more sub-blocks, one or more blocks, one or more pages, etc. As one example, a 48 GB TLC NAND memory system can include 18,592 bytes (B) of data per page (16,384+2208 bytes), 1536 pages per block, 548 blocks per plane, and 4 or more planes per device. As another example, a 32 GB MLC memory system (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory system. Other examples can include other numbers or arrangements. In some examples, a memory system, or a portion thereof, may be selectively operated in SLC mode, or in a desired MLC mode (such as TLC, QLC, etc.).

The array 120 includes physical address locations 150A, 150B, 150N. A physical address location is a location at the memory array 120 that is uniquely associated with a physical address. In operation, data is typically written to or read from the memory system 110 in pages, and erased in blocks. For example, a physical address location 150A, 150B, 150N may correspond to a page. However, one or more memory operations (e.g., read, write, erase, etc.) can be performed on larger or smaller groups of memory cells, as desired. Accordingly, in some examples, a physical address location 150A, 150B, 150N includes more or less than one page. The data transfer size of a memory system 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data. Physical address locations for storing metadata, etc. may be referred to as over-provisioned physical address locations.

Different types of memory cells or memory arrays 120 can provide for different page sizes, or may require different amounts of metadata associated therewith. For example, different memory system types may have different bit error rates, which can lead to different amounts of metadata necessary to ensure integrity of the page of data (e.g., a memory system with a higher bit error rate may require more bytes of error correction code data than a memory system with a lower bit error rate). As an example, a multilevel cell (MLC) NAND flash device may have a higher bit error rate than a corresponding single-level cell (SLC) NAND flash device. As such, the MLC device may require more metadata bytes for error data than the corresponding SLC device.

The environment 100 of FIG. 1 also illustrates the caching of an encrypted L2P pointer 172 at the host device 105. The memory system 110 (e.g., the controller 115 thereof) generates the encrypted L2P pointer 172. In some examples, the memory system 110 generates the encrypted L2P pointer 172 from an L2P pointer stored at an L2P table. The L2P pointer includes a clear logical address and a clear physical address referencing a physical address location 150A, 150B, 150N. The memory system 110 uses the cryptographic engine 142 to create an encrypted physical address 170. The encrypted physical address 170 is combined with the logical address 168 (e.g., a clear version of the logical address) to generate the encrypted L2P pointer 172. For example, the encrypted physical address 170 and logical address 168 can be incorporated into a common table or other similar data structure that makes up all or part of the encrypted L2P pointer 172.

The encrypted L2P pointer 172 is provided to the host device 105 (e.g., the processor 160 thereof). At the host device 105, the encrypted L2P pointer 172 is cached at host RAM 162.

The host device 105 (e.g., the processor 160 thereof) generates a R/W request 164. The R/W request 164 includes the encrypted physical address 170. The memory system 110 (e.g., the controller 115) receives the R/W request 164. The memory system 110 decrypts the encrypted physical address 170 and uses a resulting clear physical address to execute the R/W request at the memory array 120.

Figure 2:
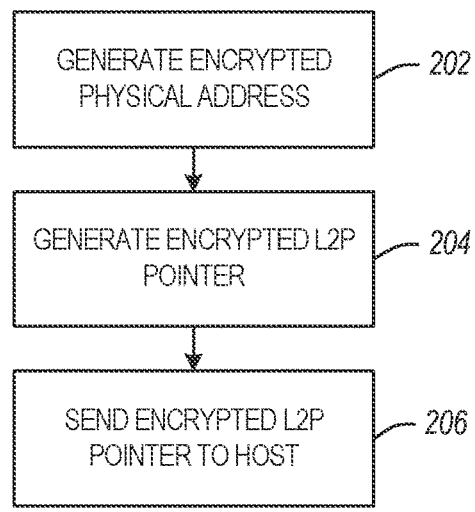
FIG. 2 is a flowchart showing one example of a process flow that may be executed by a memory system to cache an encrypted L2P pointer at a host.

FIG. 2 is a flowchart showing one example of a process flow 200 that may be executed by a memory system, such as the memory system 110, to cache an encrypted L2P pointer at a host device. For example, the process flow 200 may be executed at a controller of the memory system, such as the controller 115.

At operation 202, the memory system generates an encrypted physical address. The encrypted physical address can be generated using a clear physical address and, in some examples, a cryptographic key. The clear physical address is an address that uniquely identifies a physical address location at a memory array of the memory system. The cryptographic key is a data value that is used in a cryptographic operation along with the clear physical address to generate the encrypted physical address. The size of the cryptographic key can depend, for example, on the type of cryptographic operation that is used.

Operation 202 can be executed, for example, by a cryptographic engine of the memory system, as described herein. The cryptographic key can be stored at the memory system, for example, at a location that is not accessible to the host device. In some examples, the cryptographic key is stored at a key register of a cryptographic engine at the controller. Any suitable cryptographic operation can be used to generate the encrypted physical address.

At operation 204, the memory system generates an encrypted L2P pointer, such as the encrypted L2P pointer 172. The memory system can generate the encrypted L2P pointer by generating a data structure including an indication of the encrypted physical address and an indication of the corresponding clear logical address. In some examples, the memory system generates the encrypted L2P pointer from an existing L2P pointer. The memory system can replace the clear physical address at the existing L2P pointer with the generated encrypted physical address.

At operation 206, the memory system sends the encrypted L2P pointer to the host device for caching. The encrypted L2P pointer can be transmitted to the host device in any suitable way using any suitable protocol or standard. In some examples, the encrypted L2P pointer is sent to the host device as part of a Host Memory Buffer (HMB) feature supported by the Non-Volatile Memory Express (NVMe) standard implemented with a PCIe bus, although other arrangements are possible.

Figure 3:
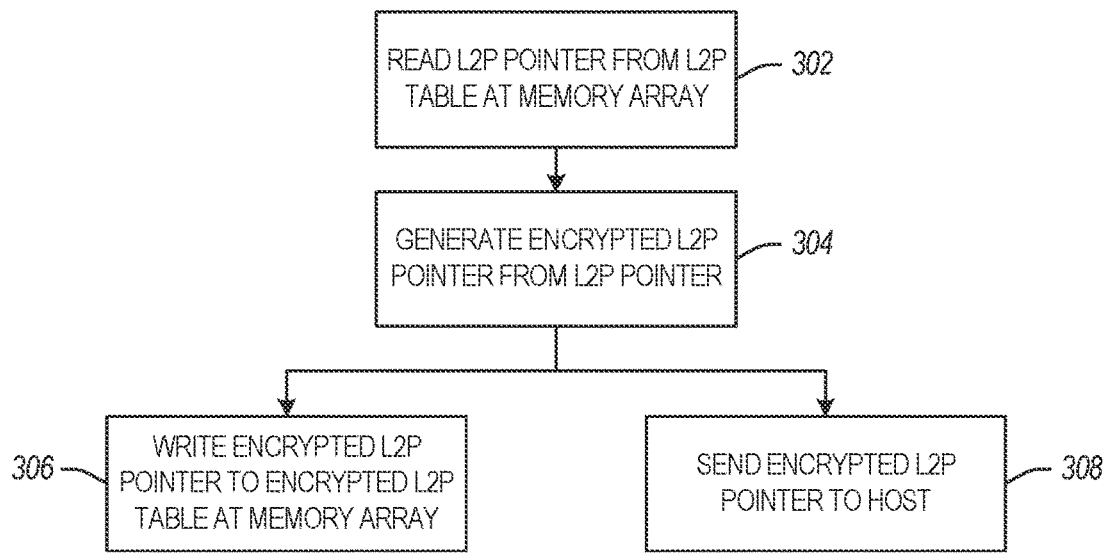
FIG. 3 is a flowchart showing one example of a process flow that may be executed at a memory system to convert a L2P pointer to an encrypted L2P pointer for caching at a host.

FIG. 3 is a flowchart showing one example of a process flow 300 that may be executed at a memory system, such as the memory system 110, to convert a L2P pointer to an encrypted L2P pointer for caching at a host device. At operation 302, the memory system reads an L2P pointer, for example, from an L2P table stored at a memory array of the memory system.

At operation 304, the memory system generates an encrypted L2P pointer from the L2P pointer. For example, the memory system uses a clear physical address indicated by the L2P pointer to generate an encrypted physical address. This can involve executing a cryptographic operation with the clear physical address and a cryptographic key, as described herein. The memory system incorporates the encrypted physical address into the L2P pointer to generate the encrypted L2P pointer. For example, the clear physical address may be removed. That is, the encrypted L2P pointer may not include the clear physical address.

There are several things that the memory system can do with the encrypted L2P pointer once it is generated. In some examples, the memory system, at operation 306, writes the encrypted L2P pointer to an encrypted L2P table. The encrypted L2P table includes encrypted L2P pointers. In some examples, the encrypted L2P table includes both encrypted L2P pointers and clear L2P pointers. The encrypted L2P table can be stored at the memory array 120 and/or at memory controller RAM. The encrypted L2P table can include encrypted L2P pointers corresponding to all or less than all of the L2P pointers at the L2P table. In some examples, the encrypted L2P table can be used to access physical address locations at the memory array, for example, as described with respect to FIG. 4. Also, in some examples, the encrypted L2P table can be used as a cache of encrypted L2P pointers that may be provided for caching at the host device, as described herein.

In addition to or instead of writing the encrypted L2P pointer to an encrypted L2P table at the memory system, the memory system can send the encrypted L2P pointer to the host device at operation 308. For example, operation 308 may be similar to operation 206 described herein.

Figure 4:
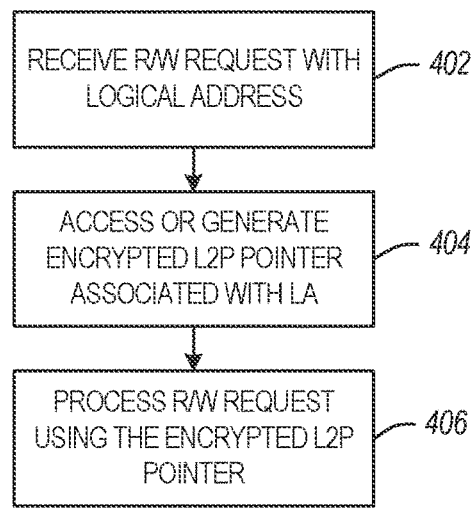
FIG. 4 is a flowchart showing one example of a process flow 400 that may be executed by a memory system to respond to R/W requests using an encrypted L2P table stored at the memory system.

In some examples, the memory system maintains an encrypted L2P table in addition to or instead of a clear L2P table. This may allow encrypted L2P pointers to be pre-generated, which can increase the speed encrypted L2P pointer caching. When the encrypted L2P table is present instead of a clear L2P table, the memory system uses the encrypted L2P table to respond to R/W requests. FIG. 4 is a flowchart showing one example of a process flow 400 that may be executed by a memory system, such as the memory system 110, to respond to R/W requests using an encrypted L2P table stored at the memory system.

At operation 402, the memory system received (and/or generates) a R/W request including a logical address. At operation 402, the memory system accesses or generates an encrypted L2P pointer using the logical address. For example, if the R/W request is a read request, the memory system uses the logical address to locate an L2P pointer at the encrypted L2P pointer table. If the R/W request is a write request, the memory system selects a physical address location for storing the data included in the write request. The memory system converts the physical address of that physical address location to an encrypted physical address and generates the encrypted L2P pointer to indicate the physical address and the logical address included with the write request.

At operation 406, the memory system processes the R/W request using the encrypted L2P pointer. For example, if the R/W request is a read request, the memory system decrypts the encrypted physical address included with the R/W request to generate a clear physical address. The memory system obtains data stored at the physical address location associated with the clear physical address and returns the data to the originator of the read request. If the R/W request is a write request, the memory system writes data included with the R/W request to the physical address associated with the physical address and stores the physical address to the encrypted L2P table.

Figure 5:
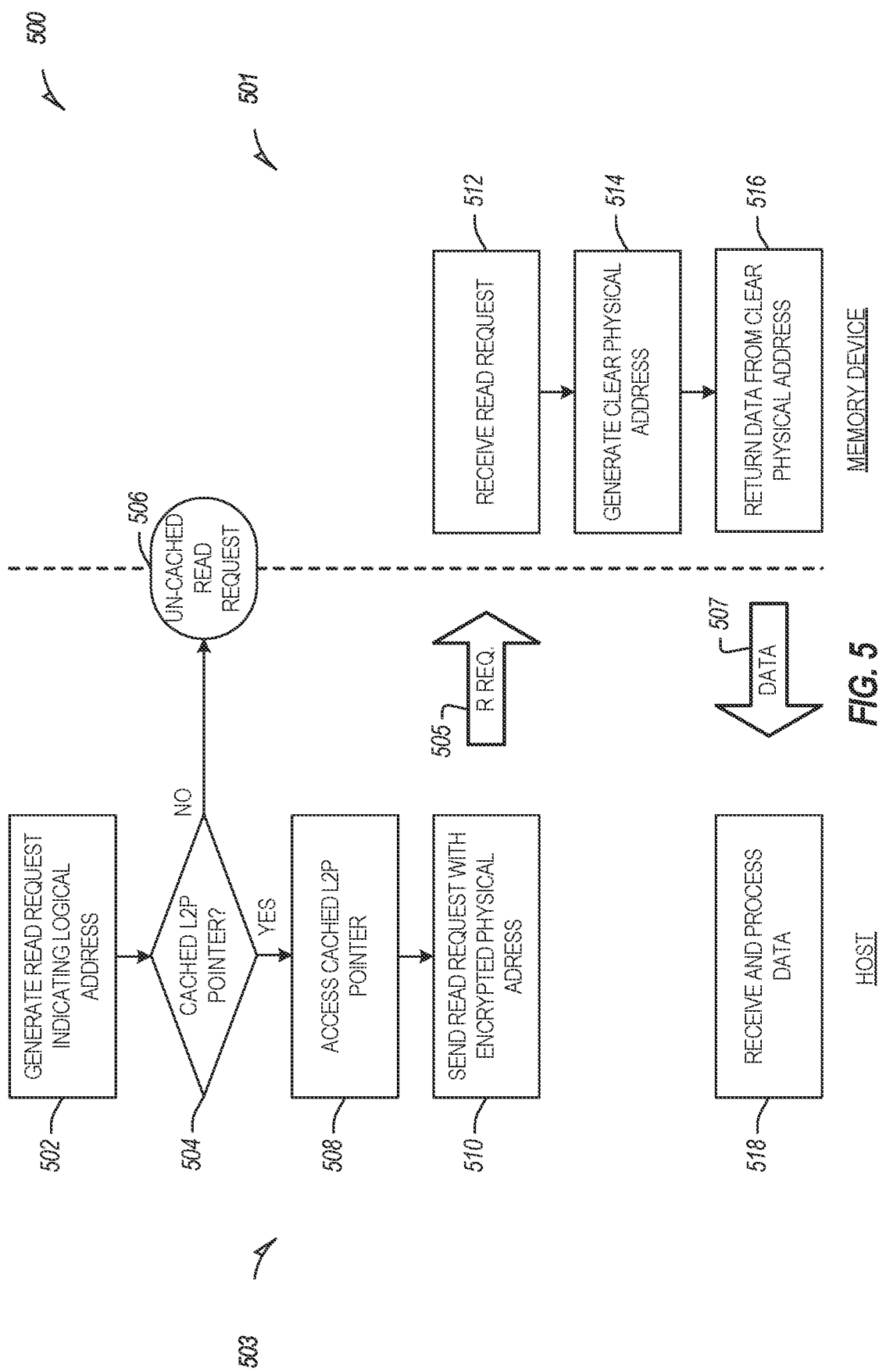
FIG. 5 is a flowchart showing one example of a process flow that may be executed by a memory system and host device to process a read request with encrypted L2P pointers cached at the host device.

FIG. 5 is a flowchart showing one example of a process flow 500 that may be executed by a memory system and host device to process a read request with encrypted L2P pointers cached at the host device. The process flow 500 includes two columns 501, 503. Column 501 includes operations that are executed by a host device, such as the host device 105. Column 503 includes operations that are executed by a memory system, such as the memory system 110. In the process flow 500, one or more encrypted L2P pointers are cached at the host device. Logical addresses at the cached L2P pointers are in the clear to the host device. Physical addresses at the cached L2P pointers are encrypted to the host device.

At operation 502, the host device generates a read request indicating a logical address. The read request may be generated by an operating system of the host device and/or may be received from an application executing at the host device. At operation 504, the host device searches one or more encrypted L2P pointers cached at the host device to determine whether any of the cached encrypted L2P pointers indicate the logical address from the read request. If none of the cached encrypted L2P pointers indicate the logical address, then the host device and memory system execute an un-cached read request routine at operation 506. An example un-cached request routine is described herein with respect to FIG. 6.

If an encrypted L2P pointer indicating the logical address is identified at operation 504, then the host device, at operation 508, accesses the cached L2P pointer. At operation 510, the host device sends to the memory system a read request 505 including the encrypted physical address indicated by the encrypted L2P pointer.

The memory system receives the read request 505 at operation 512. At operation 514, the memory system generates a clear physical address from the encrypted physical address. The memory system (e.g., a cryptographic engine thereof) can execute a cryptographic operation using the encrypted physical address and a cryptographic key. At operation 516, the memory system reads data from the physical address location corresponding to the clear physical address and returns the data 507 to the host device. The hose reads and processes the data at operation 518.

Figure 6:
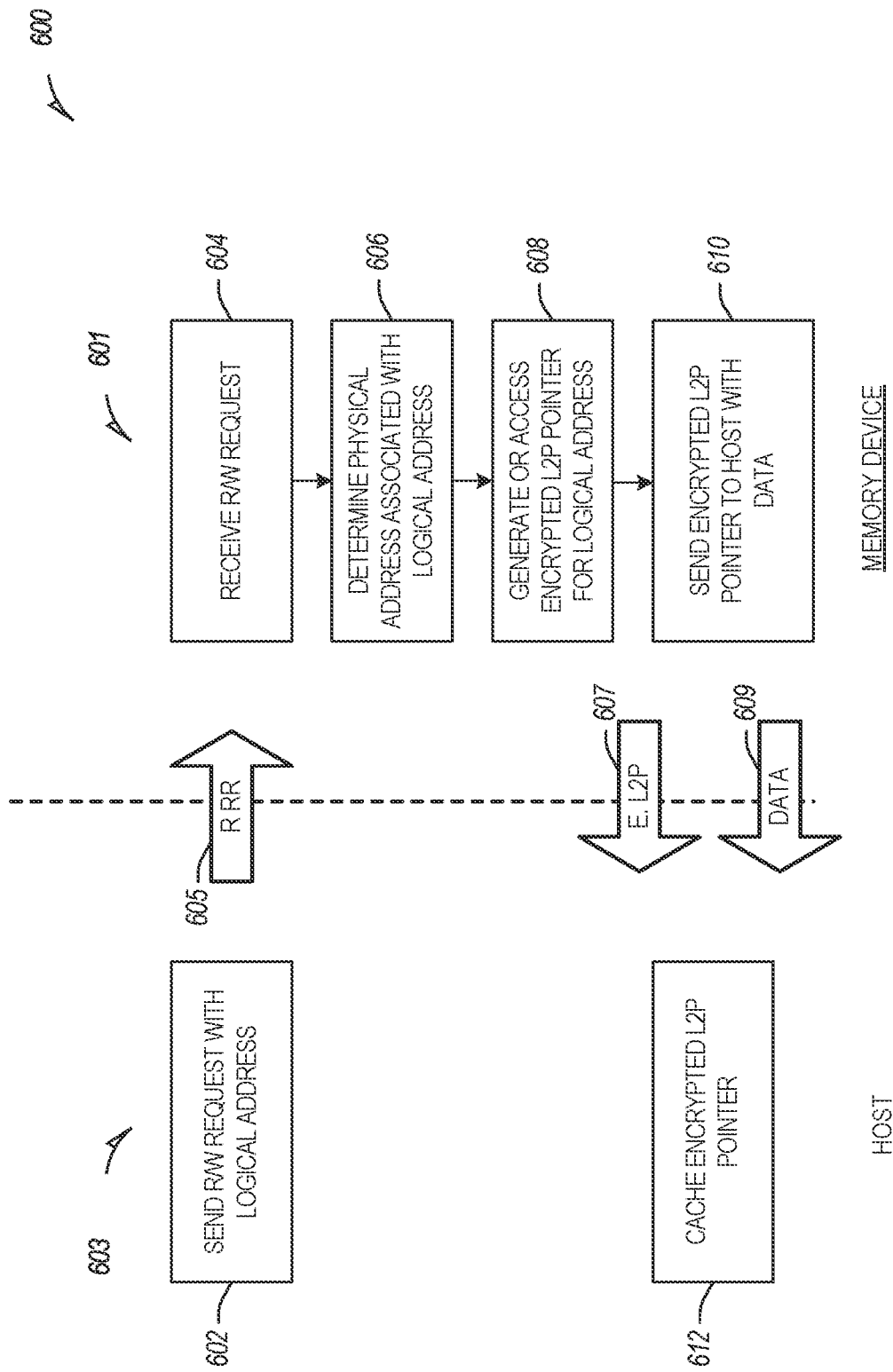
FIG. 6 is a flowchart showing one example of a process flow that may be executed by a memory system and host device to process a read request when there is no encrypted L2P pointer corresponding to the request that is cached at the host.

FIG. 6 is a flowchart showing one example of a process flow 600 that may be executed by a memory system and host device to process a read request when there is no encrypted L2P pointer corresponding to the request that is cached at the host device. The process flow 600 is one example of an un-cached read request routine that can be executed at operation 506 of the process flow 500 above. The process flow 600 includes two columns 601, 603. Column 601 includes operations that are executed by a host device, such as the host device 105. Column 603 includes operations that are executed by a memory system, such as the memory system 110.

At operation 602, the host device sends a read request 605 to the memory system. The read request 605 includes a logical address. In some examples, the read request 605 is or is based on a read request generated by the operating system of the host device and/or an application executing at the host device.

At operation 604, the memory system receives the read request 605. At operation 606, the memory system determines a physical address associated with the logical address included with the read request 605. This can include accessing an encrypted L2P pointer stored at the memory system (e.g., at the memory array and/or at controller RAM). The encrypted L2P pointer includes an encrypted physical address. The memory system decrypts the encrypted physical address to generate the physical address. In other examples, determining the physical address associated with the logical address includes accessing a clear L2P pointer stored at the memory system. The clear L2P pointer includes the physical address. The memory system reads data from the physical address location indicated by the physical address.

At operation 608, the memory system generates or accesses an encrypted L2P pointer for the logical address. For example, if an encrypted L2P pointer is already stored at the memory system, the memory system reads the encrypted L2P pointer. If an encrypted L2P pointer is not already stored at the memory system, the memory system generates an encrypted L2P pointer as described herein. At operation 610, the memory system sends the read data 609 and the encrypted L2P pointer 607 to the host device. The host device caches the encrypted L2P pointer at operation 612.

Figure 7:
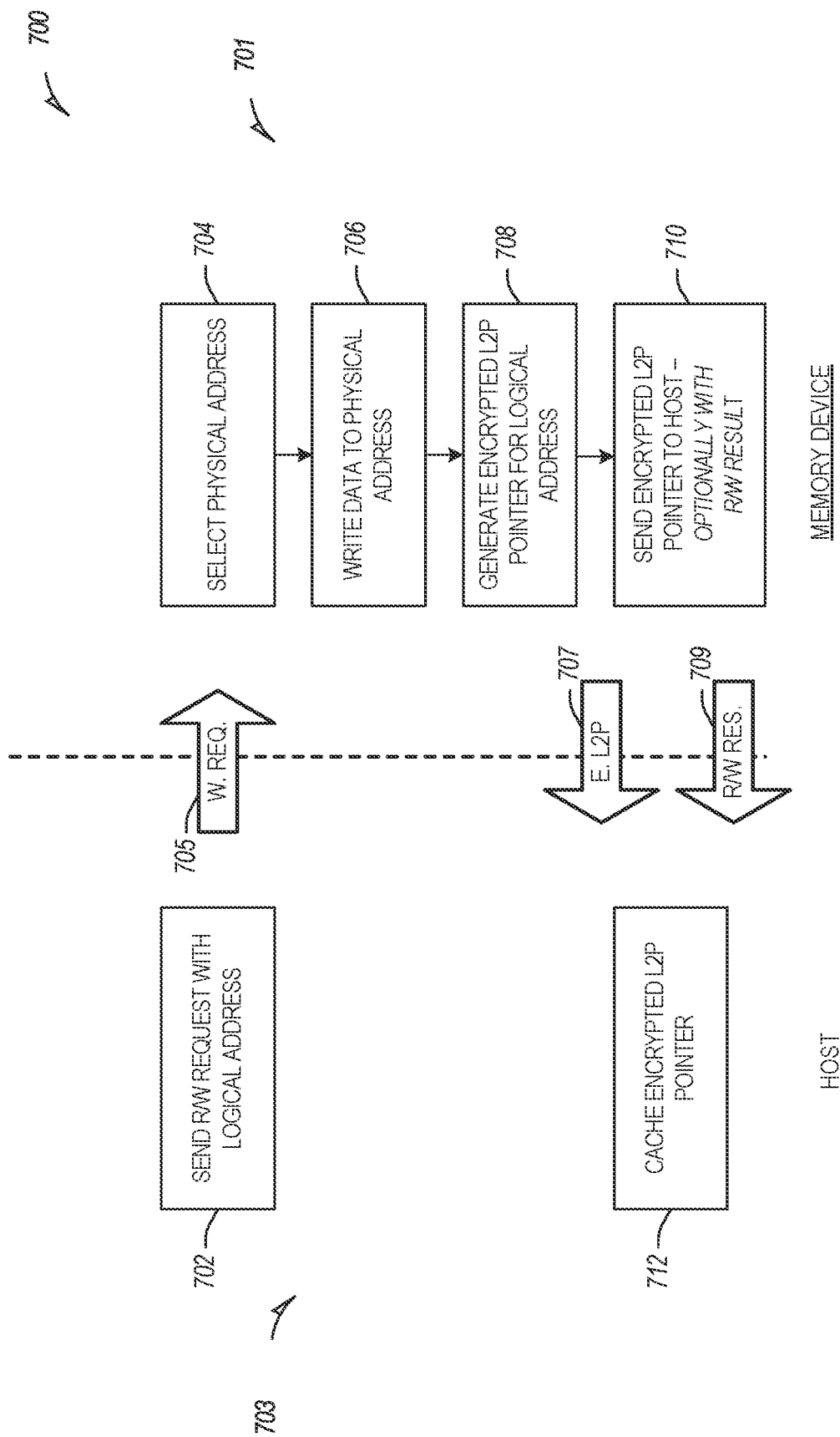
FIG. 7 is a flowchart showing one example of a process flow that may be executed by a memory system and host device to process a write request.

FIG. 7 is a flowchart showing one example of a process flow 700 that may be executed by a memory system and host device to process a write request. The process flow 700 includes two columns 701, 703. Column 701 includes operations that are executed by a host device, such as the host device 105. Column 703 includes operations that are executed by a memory system, such as the memory system 110.

At operation 702, the host device sends a write request 705 to the memory system. The read request 705 includes a logical address and data to be stored in association with the logical address. In some examples, the write request 705 is or is based on a write request generated by the operating system of the host device and/or an application executing at the host device.

At operation 704, the memory system receives the write request and selects a physical address to be associated with the logical address indicated by the write request 705. At operation 706, the memory system writes the data to the physical address location indicated by the physical address. At operation 708, the memory system generates an encrypted L2P pointer for the logical address. The memory system generates the encrypted L2P pointer as described herein. At operation 710, the memory system sends the encrypted L2P pointer 707 to the host device. Optionally, the memory system also sends a write confirmation 709 to the host device indicating that the requested write was successful. The host device caches the encrypted L2P pointer at operation 712.

Figure 8:
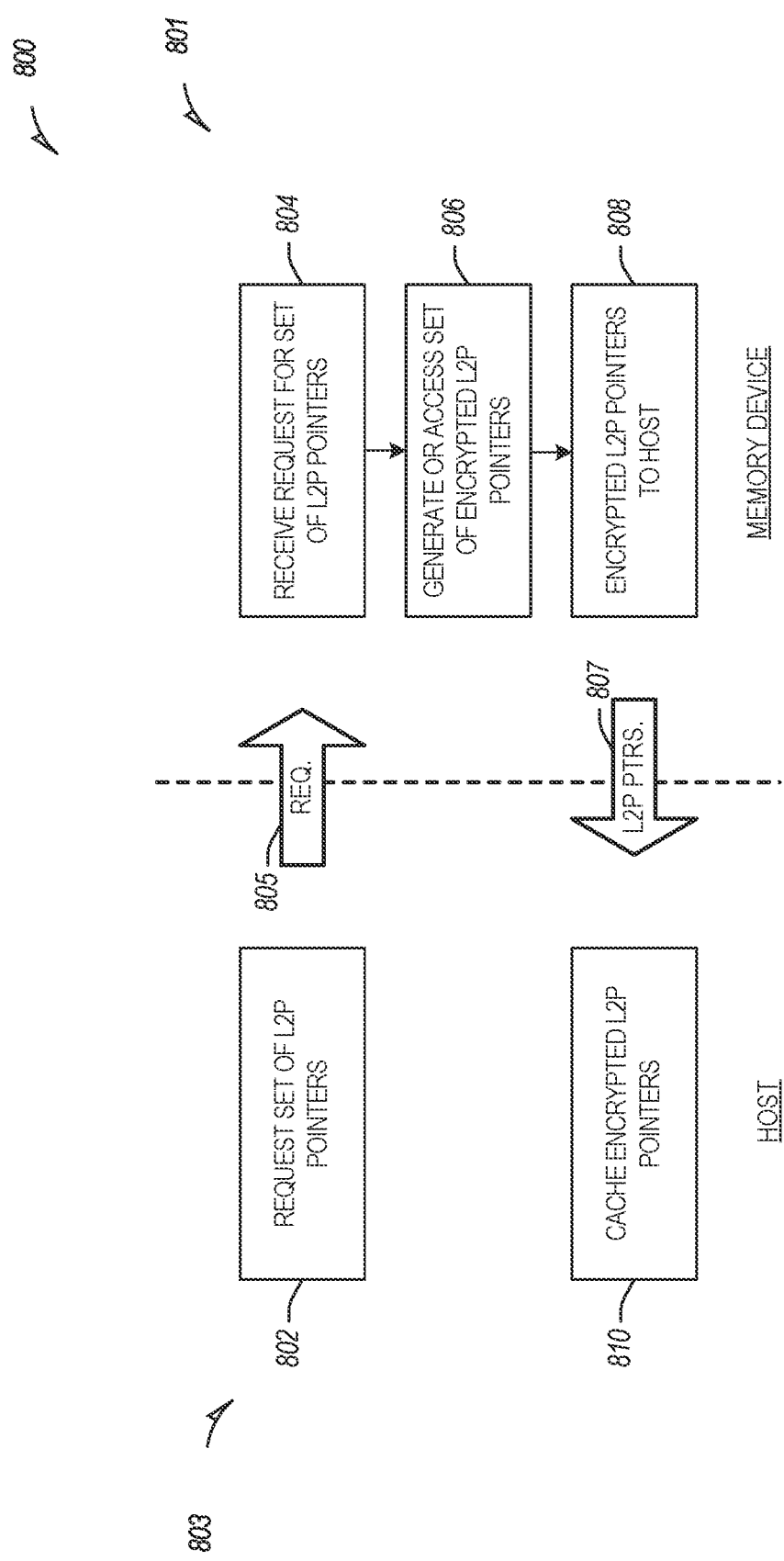
FIG. 8 is a flowchart showing one example of a process flow that may be executed by a memory system and host device to cache a set of L2P pointers at the host.

FIGS. 6 and 7 illustrate examples where the memory system provides encrypted L2P pointers to the host device for caching during transactions involving the corresponding logical and physical addresses (e.g., read requests and write requests). In some examples, the host device requests a set of L2P pointers corresponding to a set of multiple logical addresses. FIG. 8 is a flowchart showing one example of a process flow 800 that may be executed by a memory system and host device to cache a set of L2P pointers at the host device. The process flow 800 includes two columns 801, 803. Column 801 includes operations that are executed by a host device, such as the host device 105. Column 803 includes operations that are executed by a memory system, such as the memory system 110.

At operation 802, the host device sends to the memory system a request 805 for a set of L2P pointers. The request 805 may include, for example, a set of logical addresses. The memory system receives the request 805 at operation 804. At operation 806, the memory system generates or accesses a set of encrypted L2P pointers corresponding to the set of physical addresses included with the request 805. Encrypted L2P pointers for some or all of the logical addresses included with the request 805 can be already stored at the memory system. For example, the memory system may store an encrypted L2P table as described herein. If there are logical addresses in the request 805 for which the memory system does not already store a corresponding encrypted L2P pointer, the memory system generates an L2P pointer for those logical addresses, as described herein. At operation 808, the memory system sends encrypted L2P pointers 807 corresponding to the logical addresses in the request 805 to the host device. The host device caches the encrypted L2P pointers at operation 810.

Figure 9:
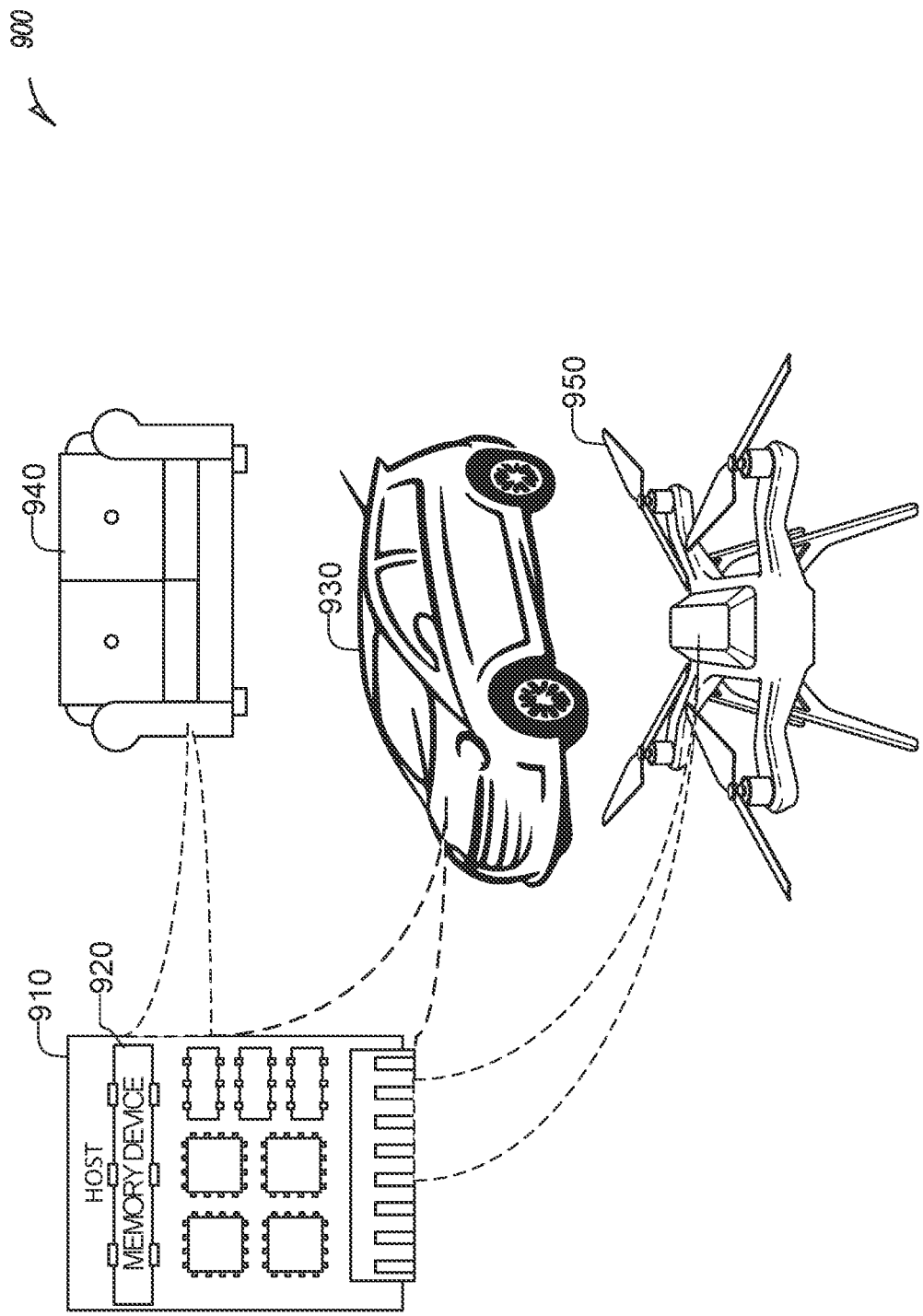
FIG. 9 shows an example host with a memory system as part of one or more apparatuses.

FIG. 9 shows an example host device 910 (e.g., processing system 101) with a memory system 920 (e.g., any of the memory systems described herein) as part of one or more apparatuses 930-950. Apparatuses include any device that may include a host device, such as host device 910. The host device 910 may be any device capable of executing instructions (sequential or otherwise). Example apparatuses include a vehicle 930 (e.g., as part of an infotainment system, a control system, or the like), a drone 950 (e.g., as part of a control system), furniture or appliances 940 (e.g., as part of a sensor system, an entertainment or infotainment system), or the like. In other examples, although not shown, apparatuses may include aeronautical, marine, Internet of Things (IOT), and other devices.

Figure 10:
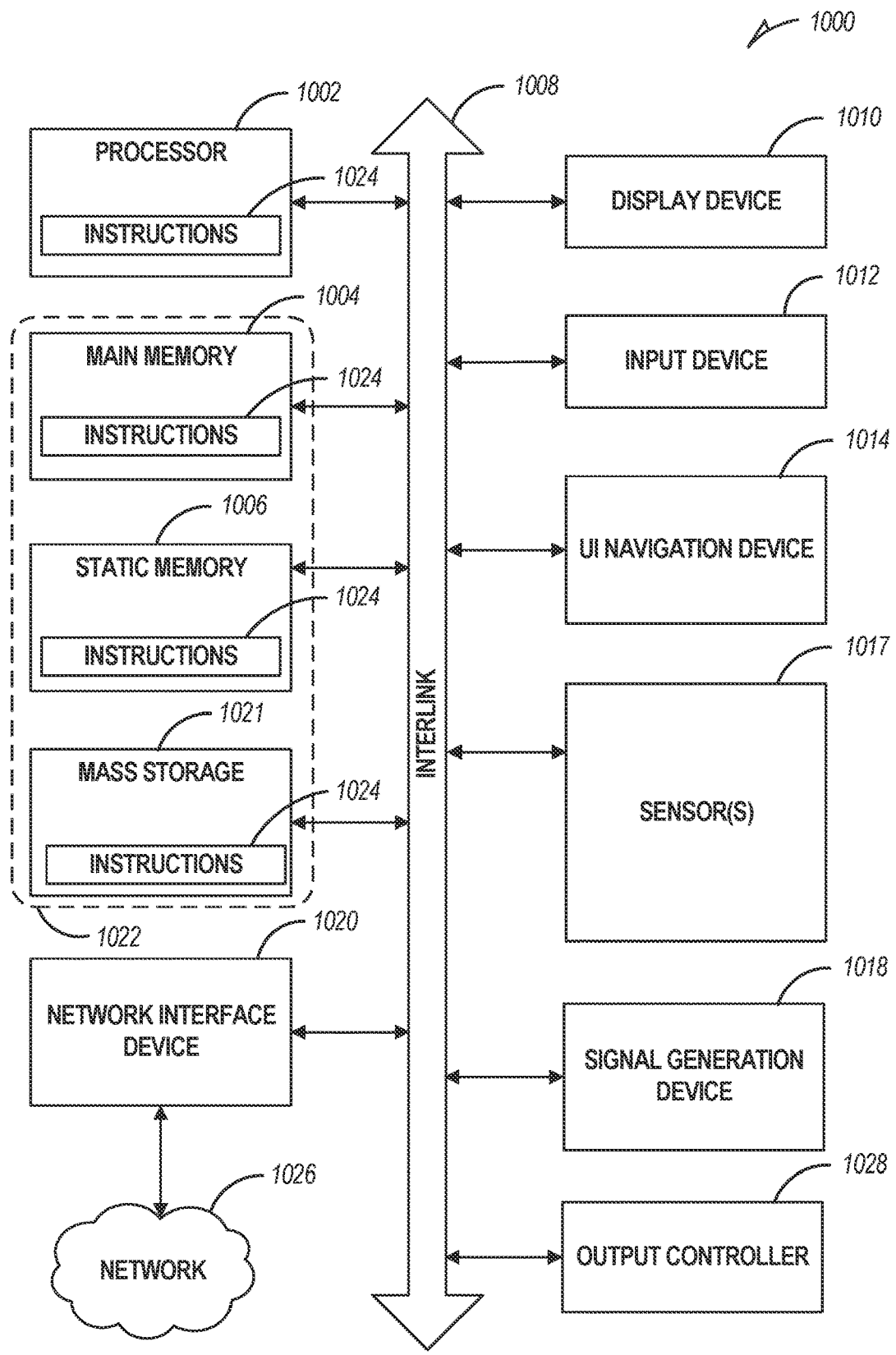
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 1000 (e.g., the host device 105, the memory system 110, etc.) may include a hardware processor 1002 (e.g., a central processing unit (CPU), a graphics processing unit (GPU), a hardware processor core, or any combination thereof, such as the memory controller 115, etc.), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1017, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute the machine readable medium 1022.

While the machine readable medium 1022 is illustrated as a single medium, the term "machine readable medium" may include a single medium or multiple media (e.g., a centralized or distributed database, or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory systems (e.g., Electrically Programmable Read-Only Memory (EPROM), Electrically Erasable Programmable Read-Only Memory (EEPROM)) and flash memory systems; magnetic disks, such as internal hard disks and removable disks; magneto-optical disks; and CD-ROM and DVD-ROM disks.

The instructions 1024 (e.g., software, programs, an operating system (OS), etc.) or other data are stored on the storage device 1021, can be accessed by the memory 1004 for use by the processor 1002. The memory 1004 (e.g., DRAM) is typically fast, but volatile, and thus a different type of storage than the storage device 1021 (e.g., an SSD), which is suitable for long-term storage, including while in an "off" condition. The instructions 1024 or data in use by a user or the machine 1000 are typically loaded in the memory 1004 for use by the processor 1002. When the memory 1004 is full, virtual space from the storage device 1021 can be allocated to supplement the memory 1004; however, because the storage 1021 device is typically slower than the memory 1004, and write speeds are typically at least twice as slow as read speeds, use of virtual memory can greatly reduce user experience due to storage device latency (in contrast to the memory 1004, e.g., DRAM). Further, use of the storage device 1021 for virtual memory can greatly reduce the usable lifespan of the storage device 1021.

In contrast to virtual memory, virtual memory compression (e.g., the Linux® kernel feature "ZRAM") uses part of the memory as compressed block storage to avoid paging to the storage device 1021. Paging takes place in the compressed block until it is necessary to write such data to the storage device 1021. Virtual memory compression increases the usable size of memory 1004, while reducing wear on the storage device 1021.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a source-side select gate (SGS), a control gate (CG), and a drain-side select gate (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory system, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory system as they occur, tracking the operations of the memory system it initiates, evaluating the memory system characteristics corresponding to a wear state, etc.)

According to one or more embodiments of the present disclosure, a memory access device may be configured to provide wear cycle information to the memory system with each memory operation. The memory system control circuitry (e.g., control logic) may be programmed to compensate for memory system performance changes corresponding to the wear cycle information. The memory system may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

EXAMPLES

Example 1 is a memory system comprising: a memory array; a controller, wherein the controller is programmed to perform operations comprising: generating a first encrypted physical address using a first clear physical address; generating a first encrypted logical-to-physical (L2P) pointer indicating the first encrypted physical address and a first logical address corresponding to the first clear physical address; and sending the first encrypted L2P pointer to a host device for storage at a host memory.

In Example 2, the subject matter of Example 1 optionally includes P pointer indicating the first logical address and the first clear physical address at the memory array associated with the first logical address.

In Example 3, the subject matter of any one or more of Examples 1-2 optionally includes wherein the controller is further programmed to perform operations comprising: generating an encrypted L2P table comprising a number of encrypted L2P pointers comprising the first encrypted L2P pointer and a second encrypted L2P pointer; and storing the encrypted L2P table at the memory array.

In Example 4, the subject matter of Example 3 optionally includes wherein the controller is further programmed to perform operations comprising: receiving from the host device a read request comprising a second logical address; accessing, from the encrypted L2P table stored at the memory array, a second encrypted L2P pointer indicating the second logical address and a second encrypted physical address; generating a second clear physical address using the second encrypted physical address; retrieving data from the memory system at the second clear physical address; and sending the data to the host device.

In Example 5, the subject matter of any one or more of Examples 1-4 optionally includes wherein the controller is further programmed to perform operations comprising: receiving a request from the host device, the request indicating a second logical address; accessing a second encrypted L2P pointer, the second encrypted L2P pointer indicating the second logical address and a second encrypted physical address; and sending the second encrypted L2P pointer to the host device.

In Example 6, the subject matter of any one or more of Examples 1-5 optionally includes wherein the controller is further programmed to perform operations comprising: receiving a read request from the host device, wherein the read request comprises an indication of the first encrypted physical address; generating the first clear physical address using the first encrypted physical address; retrieving a data unit from a physical address location associated with the first clear physical address; and returning the data unit to the host device.

In Example 7, the subject matter of any one or more of Examples 1-6 optionally includes wherein the controller is further programmed to perform operations comprising: receiving, from the host device, a request for a set of L2P pointers, the set of L2P pointers including the first L2P pointer; and sending, to the host device, a set of encrypted L2P pointers including the first encrypted L2P pointer, wherein the first encrypted L2P pointer corresponds to the first L2P pointer.

In Example 8, the subject matter of Example 7 optionally includes P pointers from the memory array.

Example 9 is a method comprising: generating, by a memory system, a first encrypted physical address using a first clear physical address; generating, by the memory system, a first encrypted logical-to-physical (L2P) pointer indicating the first encrypted physical address and a first logical address corresponding to the first clear physical address; and sending, by the memory system, the first encrypted L2P pointer to a host device for storage at a host memory.

In Example 10, the subject matter of Example 9 optionally includes P pointer indicating the first logical address and the first clear physical address at the memory system associated with the first logical address.

In Example 11, the subject matter of any one or more of Examples 9-10 optionally includes generating an encrypted L2P table comprising a number of encrypted L2P pointers comprising the first encrypted L2P pointer and a second encrypted L2P pointer; and storing the encrypted L2P table at the memory system.

In Example 12, the subject matter of Example 11 optionally includes receiving from the host device a read request comprising a second logical address; accessing, from the encrypted L2P table stored at the memory system, a second encrypted L2P pointer indicating the second logical address and a second encrypted physical address; generating a second clear physical address using the second encrypted physical address; retrieving a data unit from the second clear physical address; and sending the data unit to the host device.

In Example 13, the subject matter of any one or more of Examples 9-12 optionally includes receiving a request from the host device, the request indicating a second logical address; accessing a second encrypted L2P pointer, the second encrypted L2P pointer indicating the second logical address and a second encrypted physical address; and sending the second encrypted L2P pointer to the host device.

In Example 14, the subject matter of any one or more of Examples 9-13 optionally includes receiving a read request from the host device, wherein the read request comprises an indication of the first encrypted physical address; generating the first clear physical address using the first encrypted physical address; retrieving a data unit from a physical address location associated with the first clear physical address; and returning the data unit to the host device.

In Example 15, the subject matter of any one or more of Examples 9-14 optionally includes receiving, from the host device, a request for a set of L2P pointers, the set of L2P pointers including the a first L2P pointer; and sending, to the host device, a set of encrypted L2P pointers including the first encrypted L2P pointer, wherein the first encrypted L2P pointer corresponds to the first L2P pointer.

In Example 16, the subject matter of Example 15 optionally includes P pointers from the memory system.

Example 17 is a non-transitory computer readable medium comprising instructions thereon that, when executed by a processor, cause the processor to perform operations comprising: generating a first encrypted physical address using a first clear physical address; generating a first encrypted logical-to-physical (L2P) pointer indicating a first logical address associated with the first clear physical address and the first encrypted physical address; and sending the first encrypted L2P pointer to a host device for storage at a host memory.

In Example 18, the subject matter of Example 17 optionally includes P pointer indicating the first logical address and the first clear physical address at the memory system associated with the first logical address.

In Example 19, the subject matter of any one or more of Examples 17-18 optionally includes L2P pointer indicating the first encrypted physical address and a first logical address corresponding to the first clear physical address; and storing the encrypted L2P table at a memory system.

In Example 20, the subject matter of Example 19 optionally includes instructions thereon that, when executed by a processor, cause the processor to further perform operations comprising: receiving from the host device a read request comprising a second logical address; accessing, from the encrypted L2P table stored at a memory system, a second encrypted L2P pointer indicating the second logical address and a second encrypted physical address; generating a second clear physical address using the second encrypted physical address; retrieving a data unit from the second clear physical address; and sending the data unit to the host device.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A memory system comprising:
    a memory array;
    a controller, wherein the controller is programmed to perform operations comprising:
        sending a first secured logical-to-physical (L2P) pointer to a host device, the first L2P pointer comprising an indication of a first logical address and an indication of a first encrypted physical address for a first physical location at the memory array corresponding to the first logical address;
        receiving a read request from the host device, the read request comprising the first encrypted physical address;
        determining the first physical location at the memory array at least in part by decrypting the first encrypted physical address to generate a first clear physical address for the first physical location;
        reading a first data unit from the first physical location; and
        sending the first data unit to the host device.

2. The memory system of claim 1, the operations further comprising:
    receiving a write request from the host device, the write request comprising a second data unit, the write request also indicating a second logical address and a second encrypted physical address for a second physical location at the memory array;
    determining the second physical location at the memory array at least in part by decrypting the second encrypted physical address for the second physical location; and
    writing the second data unit to the second physical location.

3. The memory system of claim 1, the operations further comprising storing h first secured L2P pointer at a secured L2P table at the memory array.

4. The memory system of claim 1, the operations further comprising:
    receiving a second request from the host device, the second request indicating a second logical address;
    accessing a second secured L2P pointer, the second secured L2P pointer indicating the second logical address and a second encrypted physical address for a second physical location at the memory array; and
    sending the second secured L2P pointer to the host device.

5. The memory system of claim 4, the second request being a second read request, the operations further comprising:
    reading a second data unit from the second physical location; and
    sending the second data unit to the host device.

6. The memory system of claim 4, the second request being a write request comprising a second data unit, the operations further comprising writing the second data unit to the second physical location.

7. The memory system of claim 4, the accessing of the second secured L2P pointer comprising reading the second secured from an L2P table stored at the memory array.

8. The memory system of claim 1, the operations further comprising:
    receiving, from the host device, a request for a set of L2P pointers; and
    sending, to the host device, a set of secured L2P pointers, the set of secured L2P pointers comprising the first secured L2P pointer.

9. The memory system of claim 8, the operations further comprising reading the set of secured L2P pointers from the memory array.

10. A method, comprising:
    sending, by a memory system comprising a memory array, a first secured logical-to-physical (L2P) pointer to a host device, the first L2P pointer comprising an indication of a first logical address and an indication of a first encrypted physical address for a first physical location at the memory array corresponding to the first logical address;
    receiving, by the memory system, a read request from the host device, the read request comprising the first encrypted physical address;
    determining, by the memory system, the first physical location at the memory array at least in part by decrypting the first encrypted physical address to generate a first clear physical address for the first physical location;
    reading, by the memory system, a first data unit from the first physical location; and
    sending, by the memory system, the first data unit to the host device.

11. The method of claim 10, further comprising:
    receiving a write request from the host device, the write request comprising a second data unit, the write request also indicating a second logical address and a second encrypted physical address for a second physical location at the memory array;
    determining the second physical location at the memory array at least in part by decrypting the second encrypted physical address for the second physical location; and
    writing the second data unit to the second physical location.

12. The method of claim 10, further comprising storing the first secured L2P pointer at a secured L2P table at the memory array.

13. The method of claim 10, further comprising:
    receiving a second request from the host device, the second request indicating a second logical address;
    accessing a second secured logical-to-physical (L2P) pointer, the second secured L2P pointer indicating the second logical address and a second encrypted physical address for a second physical location at the memory array; and
    sending the second secured L2P pointer to the host device.

14. The method of claim 13, the second request being a second read request, further comprising:
   reading a second data unit from the second physical location; and
   sending the second data unit to the host device.

15. The method of claim 13, the second request being a write request comprising a second data unit, further comprising writing the second data unit to the second physical location.

16. The method of claim 13, the accessing of the secured L2P pointer comprising reading an L2P pointer from an L2P table stored at the memory array, the L2P pointer indicating the second logical address and a second clear physical address for the second physical location.

17. The method of claim 10, further comprising:
   receiving, from the host device, a request for a set of L2P pointers; and
   sending, to the host device, a set of secured L2P pointers, the set of secured L2P pointers comprising the first secured L2P pointer.

18. The method of claim 17, further comprising reading the set of secured L2P pointers from the memory array.

19. A non-transitory computer readable medium comprising instructions thereon that, when executed by a processor, cause the processor to perform operations comprising:
   sending, by a memory system comprising a memory array, a first secured logical-to-physical (L2P) pointer to a host device, the first L2P pointer comprising an indication of a first logical address and an indication of a first encrypted physical address for a first physical location at the memory array corresponding to the first logical address;
   receiving, by a memory system, a read request from the host device, the read request comprising the first encrypted physical address;
   determining, by the memory system, the first physical location at the memory array at least in part by decrypting the first encrypted physical address to generate a first clear physical address for the first physical location;
   reading, by the memory system, a first data unit from the first physical location; and
   sending, by the memory system, the first data unit to the host device.

20. The non-transitory computer readable medium of claim 19, the operations further comprising:
   receiving a write request from the host device, the write request comprising a second data unit, the write request also indicating a second logical address and a second encrypted physical address for a second physical location at the memory array;
   determining the second physical location at the memory array at least in part by decrypting the second encrypted physical address for the second physical location; and
   writing the second data unit to the second physical location.

* * * * *